United States Patent
Tiebout

(10) Patent No.: US 7,920,090 B2
(45) Date of Patent: Apr. 5, 2011

(54) RADAR SYSTEM

(75) Inventor: Marc Jan Georges Tiebout, Wessling (DE)

(73) Assignee: Infineon Technologies AG, Munich (DE)

( * ) Notice: Subject to any disclaimer, the term of this patent is extended or adjusted under 35 U.S.C. 154(b) by 339 days.

(21) Appl. No.: 11/415,398

(22) Filed: Apr. 28, 2006

(65) Prior Publication Data
US 2007/0257834 A1    Nov. 8, 2007

(51) Int. Cl.
*G01S 7/03* (2006.01)
(52) U.S. Cl. .................................................. 342/175
(58) Field of Classification Search .............. 342/70, 342/175
See application file for complete search history.

(56) References Cited

U.S. PATENT DOCUMENTS

| | | | | |
|---|---|---|---|---|
| 6,504,433 | B1 * | 1/2003 | Weber et al. | 330/277 |
| 6,897,735 | B2 * | 5/2005 | Nagasaku et al. | 331/117 D |
| 7,088,964 | B2 * | 8/2006 | O | 343/700 MS |
| 7,089,032 | B2 * | 8/2006 | Hongo et al. | 455/550.1 |
| 7,436,679 | B2 * | 10/2008 | Iijima et al. | 361/760 |

* cited by examiner

*Primary Examiner* — Ian J Lobo
(74) *Attorney, Agent, or Firm* — Maginot, Moore & Beck

(57) ABSTRACT

The invention provides a radar system comprising a power amplifier and a mixer, wherein the power amplifier and the mixer are integrated in a common semiconductor chip. For detecting a target object with the radar system, a high frequency signal from the power amplifier is employed as a local oscillator signal for the mixer, the radar system comprising the power amplifier and the mixer.

9 Claims, 2 Drawing Sheets

RADAR SYSTEM

FIELD OF THE INVENTION

The present invention relates to a radar system and to a method of detecting a target object employing the radar system.

BACKGROUND OF THE INVENTION

Radar systems are not only relevant regarding automotive applications, but enter to an increasing degree industrial- and consumer-applications. A typical operational area includes distance control or surveyance, for example.

Known radar implementations, e.g. based on the FMCW (Frequency Modulated Continuous Wave)-method, comprise discrete components exhibiting cross-talk between high frequency signals within the system. Furthermore, assembly and test of known radar systems require effort and generate costs.

There is a need therefore, for an apparatus and/or method that may be used in connection with radar implementations that addresses one or more of the above described shortcomings of known radar implementations

SUMMARY OF THE INVENTION

At least some embodiments of invention address one or more of the above described shortcomings by achieving improvements with regard to integration level of components, as well improvements addressing signal cross talk of high frequency signals within the system itself.

According a first embodiment of the present invention is a radar system. The radar system includes a power amplifier and a mixer. The power amplifier and the mixer are integrated in a common semiconductor chip.

Another embodiment of the present invention is a radar system comprising at least a high frequency generator connected to a power amplifier, a mixer, an antenna, and a processing unit. The power amplifier, the mixer, the antenna and the processing unit are connected to a common high frequency node.

Yet a further embodiment of the present invention includes a method including a step of detecting a target object with a radar system. The method also includes employing a high frequency signal from a power amplifier as a local oscillator signal for a mixer, the radar system comprising the power amplifier and the mixer.

The above described features and advantages, as well as others, will become more readily apparent to those of ordinary skill in the art by reference to the following detailed description and accompanying drawings.

DETAILED DESCRIPTION OF THE INVENTION

Figure 1:
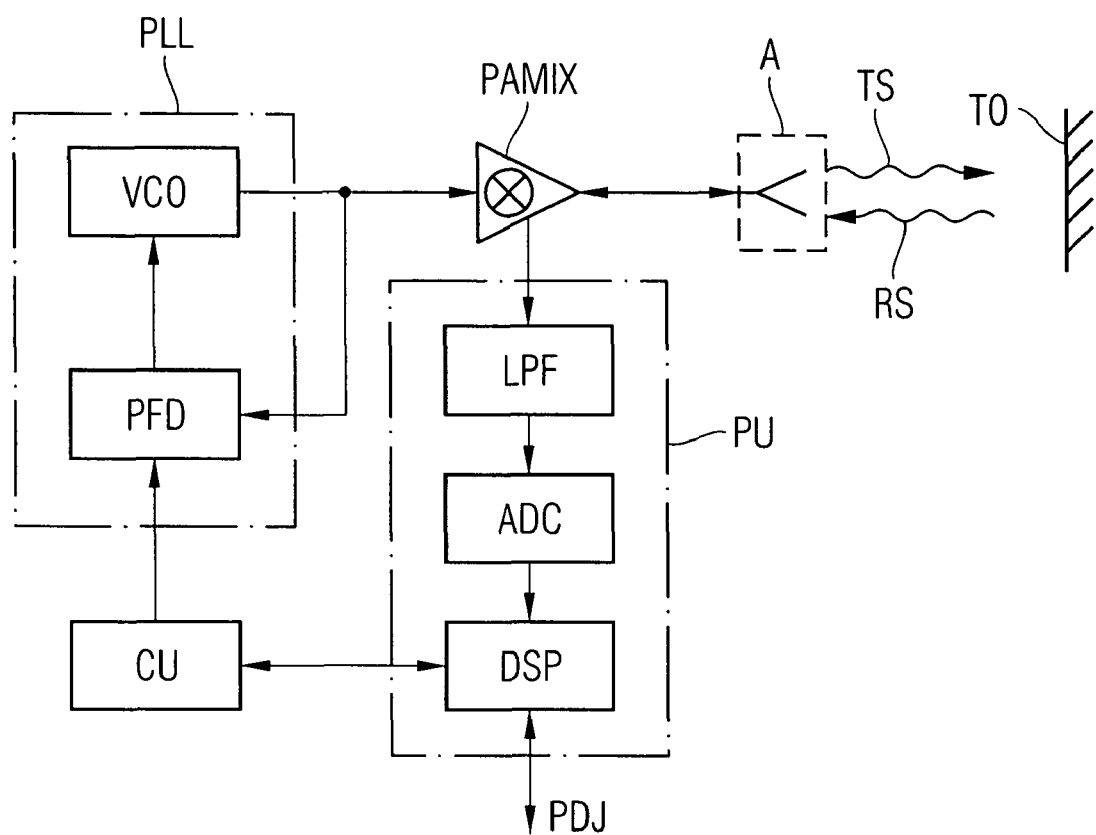
FIG. 1 is a schematic diagram for elucidating the structure of a radar system according to a preferred embodiment of the present invention.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by the reference to the following detailed description. The elements of the drawings are not necessarily drawn to scale relative to each other. Like reference numerals designate corresponding similar parts.

According to an embodiment of the present invention, a radar system comprises a power amplifier and a mixer, wherein the power amplifier and the mixer are integrated in a common semiconductor chip. An output of the power amplifier is connected to a LO (local oscillator) input of the mixer. A discrete circulator introducing cross-talk between an output signal of a power amplifier and an input signal of a mixer can be avoided. The common semiconductor chip may be a CMOS (Complementary Metal Oxide Semiconductor) chip, for example.

It is advantageous if the mixer comprises a semiconductor element with a non-linear electrical characteristic.

The semiconductor element preferably comprises at least a diode. The diode may be an inherent diode of a transistor, e.g. a bulk or p-well to drain diode of an NMOS (n-type metal-oxide-semiconductor) transistor, or a substrate diode having the substrate as an anode or cathode region, for example.

It is particularly advantageous, if the power amplifier comprises the mixer. Here, the mixer constitutes a functional part of the power amplifier. To give an example, the mixer may comprise a semiconductor element that is also used for amplifying a high frequency signal in the power amplifier.

A further embodiment of the present invention involves a short-range radar system comprising at least a high frequency generator connected to a power amplifier, a mixer, an antenna, and a processing unit, wherein the power amplifier, the mixer, the antenna and the processing unit are connected to a common high frequency node. A discrete circulator is avoided. The processing unit inter alia serves to evaluate an output signal of the mixer to gain information of a target object.

In one advantageous development of the radar system, the mixer comprises a semiconductor element with a nonlinear electrical characteristic. The electrical characteristic may be nonlinear due to a nonlinear variation of a capacity of the semiconductor element, for example.

The semiconductor element is preferably chosen as a diode, wherein the diode may also be a parasitic diode of a semiconductor device where semiconductor regions of different conductivity type are.

It is particularly advantageous, if the power amplifier comprises the mixer.

It is furthermore advantageous, if the processing unit comprises at least a lowpass filter, an A/D (analog-to-digital) converter and a digital signal processor. The lowpass filter may separate signal components from the mixer and pass those components to the A/D converter that are relevant to gain information of a target object.

It is particularly advantageous, if the power amplifier and the mixer are integrated in a common semiconductor chip.

It is furthermore advantageous, if the antenna is integrated in the common semiconductor chip.

In addition, or as an alternative, it may be provided that in a further advantageous embodiment of a radar system according to the invention the high frequency generator is integrated in the common semiconductor chip.

According to a further embodiment of the invention, a radar system comprises means for amplifying a high frequency signal that is transmitted to a target object, the high frequency signal being reflected from the target object as a reflection signal, and means for mixing the high frequency signal with the reflection signal to obtain a mixing signal to be evaluated for detection of the target object, wherein the means for amplifying the high frequency signal and the means for mixing the high frequency signal with the reflection signal are integrated in a common semiconductor chip. An output of the means for amplifying the high frequency signal is connected to the LO input of the means for mixing the high frequency signal with the reflection signal.

According to yet another embodiment of the invention, a radar system comprises means for generating a high frequency signal, means for amplifying the high frequency signal, means for transmitting the amplified high frequency signal to a target object and for receiving a reflection signal from the target object, means for mixing the amplified high frequency signal and the received reflection signal to obtain a mixing signal, means for evaluating the mixing signal to detect the target object, wherein the means for amplifying the high frequency signal and the means for mixing the amplified high frequency signal and the received reflection signal are integrated in a common semiconductor chip.

It is furthermore advantageous, if the means for transmitting the high frequency signal and for receiving the reflection signal is integrated in the common semiconductor chip.

It is also particularly advantageous, if the means for amplifying the high frequency signal comprises the means for mixing the amplified high frequency signal and the received reflection signal as a functional part thereof.

According to a further embodiment of the invention, a radar system comprises means for generating a high frequency signal, means for amplifying the high frequency signal, means for transmitting the amplified high frequency signal to a target object and for receiving a reflection signal from the target object, means for mixing the amplified high frequency signal and the received reflection signal to obtain a mixing signal, means for evaluating the mixing signal to detect the target object, wherein the means for amplifying the high frequency signal, the means for transmitting the amplified high frequency signal and for receiving the reflection signal, the means for mixing the amplified high frequency signal with the received reflection signal and the means for evaluating the mixing signal are connected to a common high frequency node.

It is particularly advantageous, if the means for amplifying the high frequency signal comprises the means for mixing the amplified high frequency signal and the received reflection signal as a functional part thereof.

It is particularly advantageous, if the means for amplifying the high frequency signal and the means for mixing the amplified high frequency signal and the received reflection signal are integrated in a common semiconductor chip.

According to a further embodiment of the invention, a method of detecting a target object with a radar system is provided, comprising the step of employing an amplified high frequency signal from a power amplifier as a local oscillator signal for a mixer, the short-range radar system comprising the power amplifier and the mixer. A discrete circulator and cross-talk between an output signal of the power amplifier and an input signal of the mixer can thus be avoided.

It is particularly advantageous, if a mixing operation of the mixer is carried out by a nonlinear semiconductor element that constitutes a part of the power amplifier.

According to a still further embodiment of the present invention, a method of detecting a target object with a radar system is provided, comprising the steps of connecting a power amplifier, a mixer, an antenna and a processing unit to a common high frequency node, amplifying a high frequency signal from a high frequency generator by the power amplifier, transmitting the amplified high frequency signal from the antenna to a target object and receiving a reflection signal from the target object, mixing the received reflection signal with the amplified high frequency signal by the mixer to obtain a mixing signal, and evaluating the mixing signal by the processing unit to detect the target object. The mixing signal may comprise a frequency corresponding to a difference in frequencies of the high frequency signal and the received reflection signal, wherein the frequency of the mixing signal implies information content with regard to the target object.

It is particularly advantageous, if the mixing is carried out by a semiconductor element having a nonlinear electrical characteristic, the semiconductor element constituting part of the power amplifier.

It is beneficial if the radar system is a short-range radar system.

In the following reference is again taken to the figures:

FIG. 1 shows a schematic diagram of a radar system according to a preferred embodiment of the invention.

With reference to FIG. 1, the radar system comprises a voltage controlled oscillator VCO generating a high frequency signal. The voltage controlled oscillator VCO and a phase frequency detector PFD, the phase frequency detector PFD obtaining the high frequency signal as a feedback signal from the voltage controlled oscillator VCO, constitute parts of a phase locked loop PLL. The high frequency signal is amplified by a power amplifier and mixer unit PAMIX, wherein both components, namely the power amplifier and the mixer, are integrated in a common semiconductor chip, e.g. a silicon chip. The amplified high frequency signal is transferred to an antenna A from where a transmission signal TS is transmitted to a target object TO. The transmission signal TS that is reflected from the target object TO returns to the antenna A as a reflection signal RS. The received reflection signal returns to the power amplifier and mixer unit PAMIX, where it is mixed with the amplified high frequency signal to output a mixing signal to a lowpass filter LPF. With respect to a frequency spectrum of the signals output to the lowpass filter LPF, the lowpass filter passes a signal component with a frequency corresponding to a difference of frequencies of the amplified high frequency signal and the received reflection signal and this signal component is forwarded to an analog-to-digital converter ADC. After converting the signal from the lowpass filter LPF to a digital signal, the digital signal is transferred to a digital signal processor DSP for evaluating the signal in order to gain information of the target object TO. The lowpass filter LPF, the analog-to-digital converter ADC as well as the digital signal processor DSP constitute parts of a processing unit PU. The processing unit PU may communicate via a pure digital interface PDI with a host (not shown) and it may also communicate with a control unit CU controlling the phase locked loop PLL.

Figure 2:
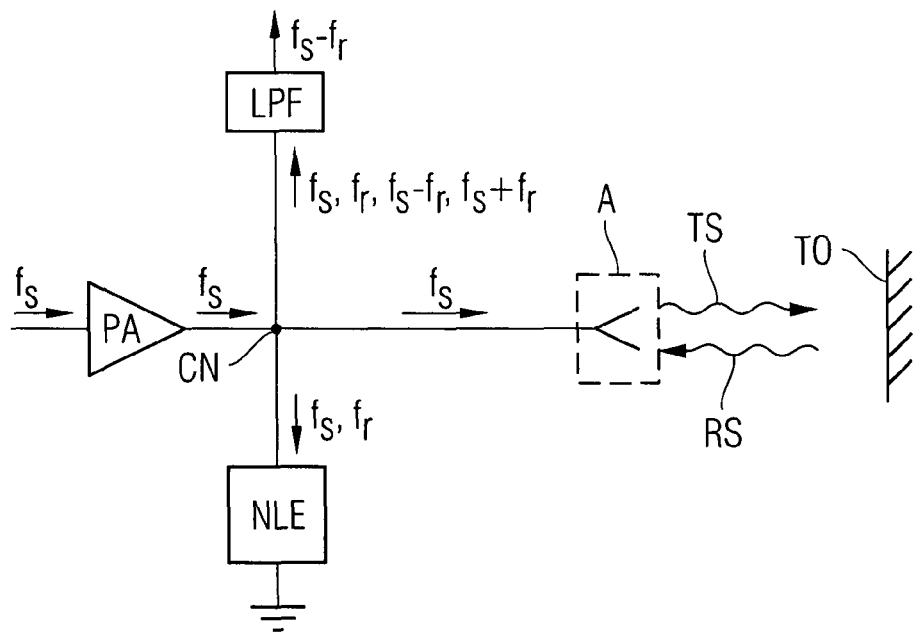
FIG. 2 is a schematic diagram for elucidating the structure of a radar system and signal paths when detecting a target object employing the radar system.

FIG. 2 shows a schematic diagram of a part of a radar system according to a further embodiment of the invention. It is to be noted that the diagram of FIG. 2 merely shows these components of the radar system that are particularly relevant for elucidation of this embodiment.

In FIG. 2, a high frequency signal having a frequency fs generated by a high frequency generator like a voltage controlled oscillator (not shown) is input to a power amplifier PA. The power amplifier PA amplifies the high frequency signal and outputs an amplified high frequency signal of frequency fs to the antenna A from where it is transmitted as the transmission signal TS to a target object TO. The part of the transmission signal TS that is reflected from the target object TO returns to the antenna A as the reflection signal RS and gets received at the antenna A. The received reflection signal RS has a frequency fr. The amplified high frequency signal comprising the frequency fs as well as the received reflection signal comprising the frequency fr are mixed by a nonlinear element NLE operating as the mixer. The nonlinear element may comprise a semiconductor element like a diode. After mixing these signals, a mixing signal comprising at least frequency components |fs−fr| and |fs+fr| is input to the lowpass filter LPF. It is to be noted that also signal components with frequencies of fs as well as fr are input to the lowpass filter LPF. A cut-off frequency of the lowpass filter LPF is appropriately chosen for the signal component with the frequency fs-fr to pass the lowpass filter. This component containing information of the target object TO is transferred to the processing unit PU (not shown) for evaluation.

It can be gathered from FIG. 2 that the power amplifier PA, the lowpass filter LPF, the nonlinear element NLE as well as the antenna A are connected to a common high frequency node CN. Thereby, unwanted signal cross-talk between signal paths related to different high frequency nodes within the radar system can be avoided.

Figure 3:
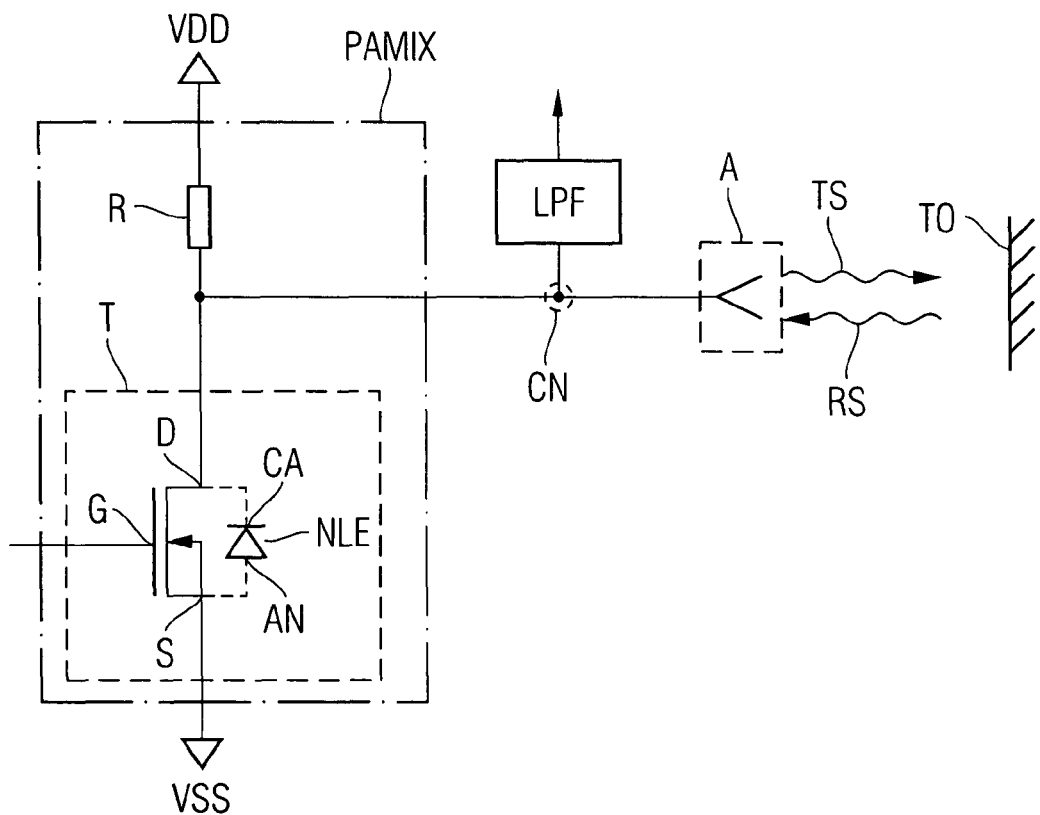
FIG. 3 is a schematic representation for elucidating the structure of a radar system according to a further preferred embodiment of the invention.

FIG. 3 shows a schematic diagram of a radar system according to a further embodiment of the invention. As already mentioned with regard to the previous embodiment shown in FIG. 2, merely components of the radar system being relevant for elucidating the embodiment of FIG. 3 are illustrated. The power amplifier and mixer unit PAMIX comprises a resistor R and an n-channel MOSFET (Metal Oxide Semiconductor Field Effect Transistor) T. The transistor T fulfills several functions with respect to the radar system. On the one hand, it is used to amplify a high frequency signal from a voltage controlled oscillator VCO (not shown). The high frequency signal may be input at a gate G of the transistor T. On the other hand, the transistor T comprises a diode functioning as the nonlinear element NLE. This diode NLE is inherent to the transistor T. A cathode C of the diode corresponds to a drain region D of the transistor T. An anode A of the diode NLE corresponds to a bulk or a p-well region of the transistor T. A source region S and the drain region D of the transistor T are formed within the bulk or p-well region. The source region S and the bulk or p-well region are shortened. The diode NLE is commonly also denoted as a parasitic diode of the transistor T. A nonlinear electrical characteristic of the diode is given by the junction capacitance between the bulk or p-well region and the drain region D, for example. Thus, the transistor T does not only amplify the high frequency signal from the high frequency generator, but it does also mix signal components arriving at the drain D by its diode NLE working as the mixer. The mixer and the power amplifier in this embodiment are not only integrated in a common semiconductor chip, but these functions are also realized by a common semiconductor element like the transistor T. The power amplifier and mixer unit PAMIX is connected to a high reference voltage VDD as well as to a low reference voltage VSS. The antenna A, the lowpass filter LPF and the drain region D of the transistor T of the power amplifier and mixer unit PAMIX are connected to the common high frequency node CN.

In the following, the principle of employing the radar system is described with respect to detecting the target object TO. After amplifying the high frequency signal using the transistor T, the amplified high frequency signal is transmitted from the antenna A as a transmission signal TS to a target object TO. A reflection of the transmission signal TS from the target object TO returns to the antenna A as the reflection signal RS. The reflection signal RS is received by the antenna A and the received reflection signal as well as the amplified high frequency signal are mixed by the diode NLE to provide the mixing signal entering the lowpass filter LPF. This mixing signal is filtered by the lowpass filter LPF to select the signal part comprising a frequency component corresponding to the difference of frequencies of the high amplified frequency signal and the received reflection signal. A proper operation of the low-pass filter LPF is ensured by setting the cut-off frequency of the low-pass filter LPF. The signal part output by the lowpass filter LPF comprises information of the target object TO that is to be further evaluated by a processing unit (not shown).

Although specific embodiments have been illustrated and described herein, it will be appreciated by those of ordinary skill in the art that a variety of alternate and/or equivalent implementations may be substituted for the specific embodiments shown and described without departing from the spirit and scope of the present invention. This application is intended to cover any adaptations or variations of the specific embodiments discussed herein.

Therefore, it is intended that this invention be limited only by the claims and the equivalents thereof.

The invention claimed is:

1. A radar system comprising:
   a power amplifier and a mixer,
   wherein the power amplifier and the mixer are not discrete components but are integrated in a common semiconductor chip, wherein the power amplifier includes the mixer as a functional part thereof, and the mixer comprises at least a diode, the diode being a semiconductor element of both the power amplifier and the mixer.

2. The radar system of claim 1, wherein the power amplifier includes a MOSFET and wherein the diode comprises an inherent diode of the MOSFET.

3. The radar system of claim 1, wherein:
   the power amplifier includes a transistor having a gate, a source, and a drain,
   the transistor includes the diode, the diode extending between the drain and the source of the transistor with a cathode of the diode corresponding to the drain of the transistor,
   the transistor is configured to amplify a first signal received at the gate, and
   the diode is configured to mix the first signal with a second signal received at the drain.

4. A radar system comprising at least a high frequency generator connected to a power amplifier, a mixer, an antenna, and a processing unit, wherein the power amplifier, the mixer, the antenna and the processing unit are not discrete components but are integrated in a common semiconductor chip and wherein the power amplifier, the mixer, the antenna and the processing unit are connected to a common high frequency node, and
   wherein the mixer comprises a semiconductor element with a nonlinear electrical characteristic, and wherein the semiconductor element comprises at least a diode.

5. The radar system according to claim 4, wherein the processing unit comprises at least a lowpass filter, an A/D converter and a digital signal processor.

6. The radar system according to claim 4, wherein the power amplifier and the mixer are integrated in a common semiconductor chip.

7. The radar system according to claim 6, wherein the antenna is integrated in the common semiconductor chip.

8. The radar system according to claim 6, wherein the high frequency generator is integrated in the common semiconductor chip.

9. A radar system comprising at least a high frequency generator connected to a power amplifier, a mixer, an antenna, and a processing unit, wherein the power amplifier, the mixer, the antenna and the processing unit are not discrete components but are integrated in a common semiconductor chip and wherein the power amplifier, the mixer, the antenna and the processing unit are connected to a common high frequency node, and wherein the mixer comprises a semiconductor element with a nonlinear electrical characteristic, and wherein the semiconductor element comprises at least a diode, and wherein the power amplifier comprises the mixer.

\* \* \* \* \*